F. C. WIDMANN.
RING CLAMP.
APPLICATION FILED AUG. 5, 1908.
941,832.                              Patented Nov. 30, 1909.
FIG. 1
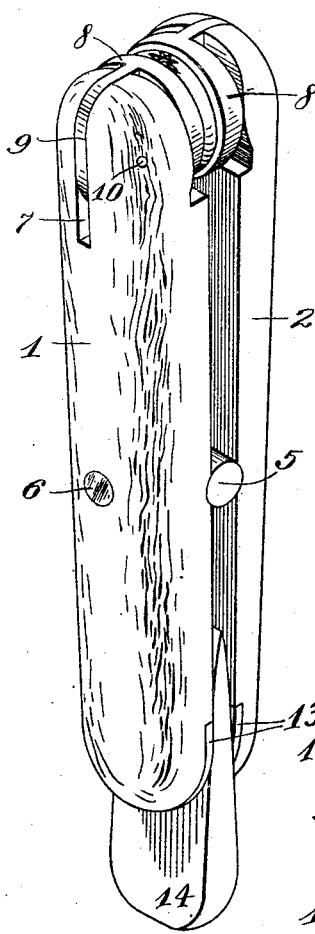
FIG. 2
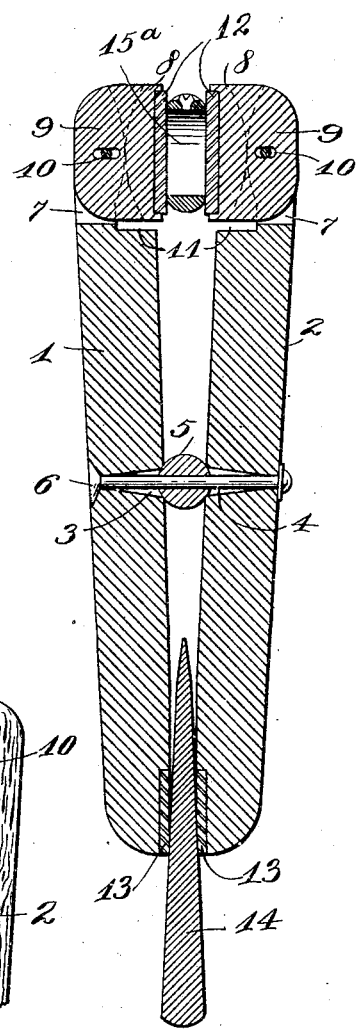
FIG. 3
WITNESSES:                              INVENTOR,
                                        Frank C. Widmann,
                                    BY Bakewell, Kerr & Hull
                                              ATTYS.

UNITED STATES PATENT OFFICE.

FRANK C. WIDMANN, OF CLEVELAND, OHIO.

RING-CLAMP.

941,832.

Specification of Letters Patent.

Patented Nov. 30, 1909.

Application filed August 5, 1908. Serial No. 447,154.

*To all whom it may concern:*

Be it known that I, FRANK C. WIDMANN, a citizen of the United States, residing at Cleveland, in the county of Cuyahoga and State of Ohio, have invented a certain new and useful Improvement in Ring-Clamps, of which the following is a full, clear, and exact description, reference being had to the accompanying drawings.

This invention relates to clamps for holding rings or similar articles while stones are being set therein, and it has for its object the production of a clamp that is adapted to securely hold rings of practically all shapes and sizes.

Heretofore, as far as I am aware, the jaws between which the rings are clamped have been rigid or non-adjustable, so that, while the jaws may be adapted to engage properly with the side edges of one shape of ring, they will not properly engage with rings of other shapes, but will leave the latter insecurely clamped and liable to slip or turn. In my invention, the clamping jaws are pivoted to the clamping bars and are, by this construction, rendered self-adjustable so as to accommodate themselves to practically any shape of ring.

In the accompanying drawings, forming a part hereof, Figure 1 is a perspective view of my improved clamp having a ring held therein; Fig. 2 is a longitudinal section through the center of the clamp, the same holding a ring of one form; and Fig. 3 is an elevation of the clamping jaws holding a differently shaped ring.

Taking up a more detailed description of my invention by reference to the drawings, 1 and 2 represent the clamping bars, which are provided near their centers with perforation 3 and 4 respectively, said perforations being, by preference, slightly conical, as shown. Between the bars is a cylindrical fulcrum member 5 that is also perforated; and, through the perforations in the bars and in the member, extends a pivot pin 6, which is so headed at its ends that it will not draw through the bars. At one of their ends the bars are slotted at 7, and in these slots I pivot the clamping jaws, said jaws having recessed disk-shaped face-portions 8 that are adapted to face each other as shown. At the rear of each of the jaws is a tongue 9 that extends into the slots 7, being held therein by pivot pins 10. The rear of the face portions 8 and the front of the adjacent portions of the bars 1 and 2 are convexed, as shown in Fig. 3, in order to permit the jaws to swing about the pivot pins; and, to prevent the jaws from binding during their swinging motion, I preferably elongate slightly the pivot holes in the tongues 9, as shown in Fig. 2. To accommodate the jaws and to prevent them from projecting too far inwardly, the bars are recessed at 11; and in order to increase the friction on the ring, the faces of the jaws are recessed, in which recesses I place some material 12, preferably leather, that will securely grip the rings. The bars 1 and 2 extend beyond the fulcrum member 5, and have their ends recessed to receive friction members 13, between which, a wedge 14 is adapted to be forced in order to spread apart these ends of the bars and cause the jaws to securely grip the ring. These friction members may also be made of leather.

As shown in Fig. 3, the ring 15 is much narrower at one side than the other and the jaws are tilted, which position they have automatically assumed as the clamp is tightened.

In Fig. 2 the ring 15$^a$ has its opposite edges parallel, but the jaws nevertheless automatically adjust themselves to this shape of ring.

Having thus described my invention, I claim:

1. In a ring clamp, a pair of bars that are pivotally secured together at a point substantially midway their ends, one end of said bars being slotted, a gripping jaw for each of said bars, each of said jaws comprising a disk portion and a tongue at the rear of said portion, said tongues extending into the slots in the bars and the tongues being provided with elongated apertures, pins projecting through the bars and through the elongated apertures in the tongues, the adjacent surfaces of the jaws and the bars being convexed in order that the jaws may turn freely upon their pivots, frictional material carried by the adjacent faces of the jaws and means for forcing said jaws toward each other, for the purpose specified.

2. In a ring clamp, a pair of bars that are pivotally secured together at a point substantially midway their ends, one end of said bars being slotted, a gripping jaw for each of said bars, each of said jaws comprising a disk portion and a tongue at the rear of said portion, said tongues extending into the slots in the bars and the tongues being provided with elongated apertures, pins projecting through the bars and through the elongated apertures in the tongues, the adjacent surfaces of the jaws and the bars being convexed in order that the jaws may turn freely upon their pivots, frictional material carried by the adjacent faces of the jaws, and a wedge that is adapted to be inserted between the ends of the bars opposite the jaws for forcing said jaws toward each other, for the purpose specified.

In testimony whereof, I hereunto affix my signature in the presence of two witnesses.

FRANK C. WIDMANN.

Witnesses:
J. B. HULL,
A. J. HUDSON.